(No Model.)  2 Sheets—Sheet 1.

K. K. KARLSTÉEN.
OVEN.

No. 489,651. Patented Jan. 10, 1893.

Sekt. i-k.

Witnesses.
H. H. Halsted
J. L. Curtis

Karl Knut Karlstéen
Inventor
By John J. Halsted Jr.
his Attys (No Model.) 2 Sheets—Sheet 2.

K. K. KARLSTÉEN.
OVEN.

No. 489,651. Patented Jan. 10, 1893.

Sekt. n-o.

Sekt. p-q.

Sekt. l-m.

Witnesses.
H. H. Halsted.
J. L. Curtis.

Karl Knut Karlstéen.
Inventor.
By John J. Halsted & Son
his Atty's

UNITED STATES PATENT OFFICE.

KARL KNUT KARLSTÉEN, OF STOCKHOLM, SWEDEN.

OVEN.

SPECIFICATION forming part of Letters Patent No. 489,651, dated January 10, 1893.

Application filed June 9, 1891. Serial No. 395,671. (No model.)

*To all whom it may concern:*

Be it known that I, KARL KNUT KARLSTÉEN, a subject of the King of Sweden and Norway, and a resident of Stockholm, Sweden, have invented an Improved Oven, of which the following is a specification.

This invention has for its object an oven that makes possible a uniform baking, has a great capacity, needs comparatively little fuel and little space, at the same time that it is easy to manage, and to regulate for different kinds of baking.

Figure 1:
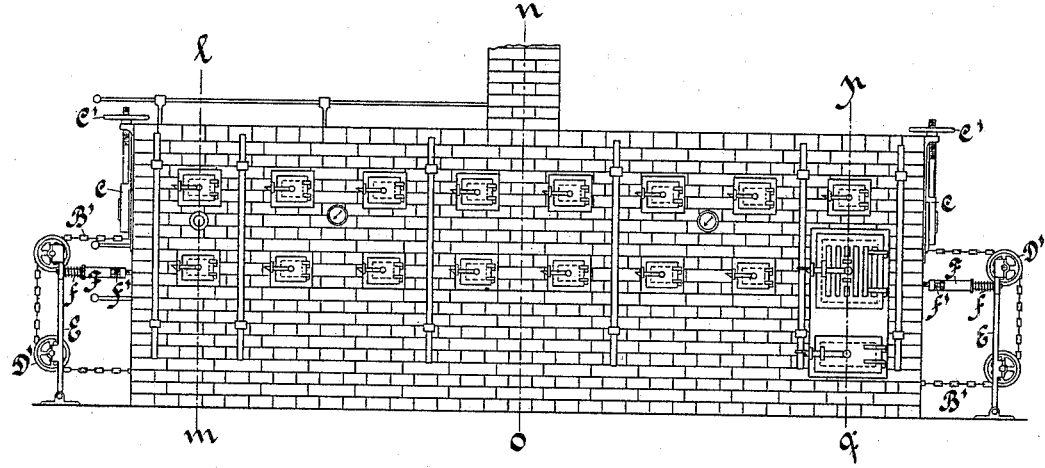
Figure 2:
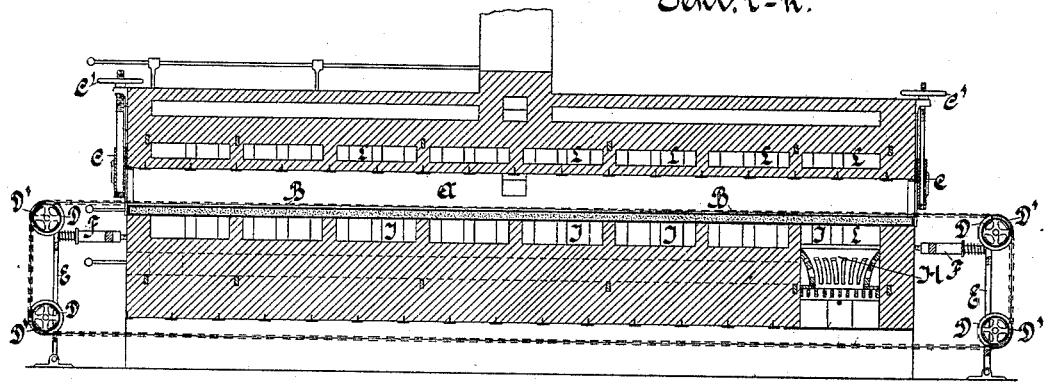
Figure 3:
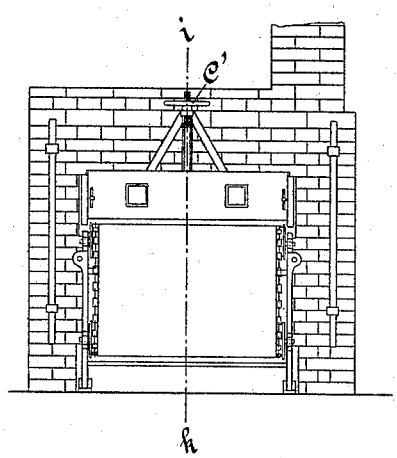
Figure 5:
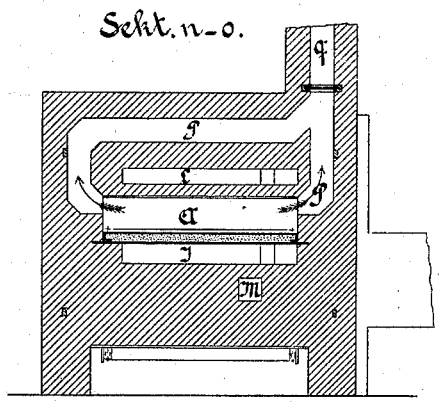
Figure 4:
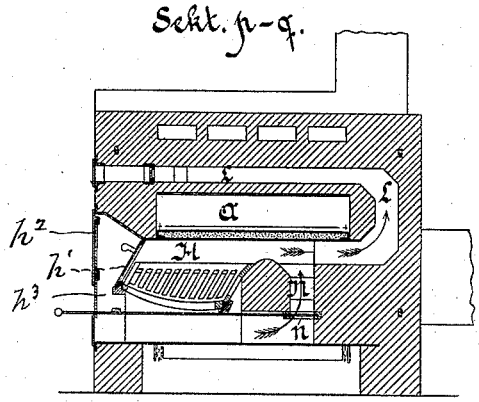
Figure 6:
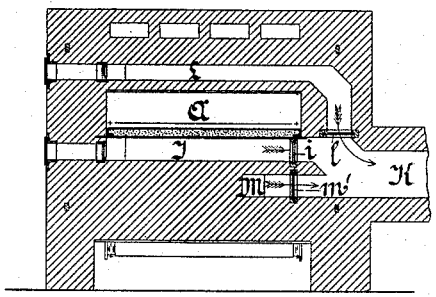

On the accompanying drawings, Figure 1 is a front view of this oven, Fig. 2 a longitudinal section, Fig. 3 an end view and Figs. 4 5 6 vertical cross-sections in the lines $p. q. n. o.$ and $l. m.$ respectively of Fig. 1.

The oven relates to that kind of ovens, which is provided with a baking chamber A, open in both ends. The end of the baking chamber in which the bread is put in, preferably ought to be situated over the fireplace, from which the products of combustion are led around the baking chamber through channels or canals situated over and under this chamber. Close to the hearth (which is lined with ironplates) runs through the baking chamber an endless wire gauze B, that is led over rolls D, placed outside the oven, and then through a canal situated in the lower part of the oven. This passing of the endless wire-gauze belt clear outside of the furnace, and beneath it, and also beneath the fire-place, as shown, prevents its being in all its parts continually subject to a high degree of heat: that portion of it which is carried above and close to the upper face of the heated hearth, being only about one-third of its length, consequently the remaining two-thirds ($\frac{2}{3}$) have an opportunity to cool off somewhat and gradually before again passing over the hearth: this tends greatly to preserve the belt and to prevent its being prematurely weakened or destroyed by needless heating: and besides it is always when in action, open to inspection as to its condition, for its entire length. At the sides of the wire gauze B there are placed chains B' running over corresponding wheels D', placed at each end of the rolls D above mentioned. The wire gauze is put in motion by turning one of the axles of these rolls either by hand with a crank, or by using power from a motor. The rolls D rest in supports E adjustably fixed on the floor in such a manner that the wire gauze can be stretched when necessary. For this purpose arms F acted upon by spiral springs $f$ are placed between the supports E and each end of the oven. The arms F are provided with screws $f'$, permitting the lengthening or shortening of the arms. The openings of the baking chamber are covered by shutters C the position of which can be regulated by means of turning wheels C'. The shutters are composed of double plates, between which the outer air can pass to the interior of the chamber and cool the shutter.

The fire place H. preferably ought to be placed at the end of the oven under the front end of the baking chamber. It has a grate, that on all sides is in contact with the air, so that the combustion is facilitated and the destroying by heat of the surrounding brickwork is prevented. The fireplace is covered in the fore-end by a shutter $h'$. pivoted at the lower border and leaning toward the inside. Outside this is placed another shutter $h^2$. provided with openings through which air can be let in to the space between the two shutters, thus cooling these and then streaming or passing to the grate. When charging the fireplace with coal, the outer shutter is opened and the inner one is thrown down outward, whereby it shuts the communication $h^3$. between the ashchamber and the room outside the oven. Consequently the air can not stream down to the ashchamber and cause eruption of the flame, but the air is instead forced directly to the fire. In the firebridge there is a passage N, shut by a register $n$ through which air can be led to the flame directly from the ash chamber to effect the complete combustion of the gases passing over the bridge. From the furnace there is a further canal or passage L over, and another similar canal T under the baking chamber. Both canals communicate with the chimney K and are curved to and fro over the breadth of the oven, thus allowing a complete using of the heat from the passing gases. From the furnace and under the canal T also another similar canal M passes directly to the chimney, permitting the letting off the heat from the oven when the baking chamber is overheated; for this purpose both registers in the canals L and T are shut, while the register $m'$ is held open. By means of the registers $l$ and $i$, the over—and underheat in the oven can be increased or diminished as need be. From the baking chamber finally two channels or canals P. with suitable registers pass to a special outlet $q$., serving to remove the moisture, formed in the baking chamber, when such moistness is not required for the baking; as for example by baking of dry bread. The bread is laid on the wire gauze at that end of it which is over the fire where the heat is greatest and afterward it is carried on successively through the baking-chamber, being exposed to a successively decreasing heating, which is the most advantageous, because the greatest heat is required, just when the bread is put in the oven.

I claim:

1. A baker's oven having in combination with a baking chamber open at both ends, an endless wire-gauze bread-carrier, and guide-rollers for such carrier outside of such chamber and serving to move this carrier near the bottom of this chamber and through it, and then back outside of and under the oven and fire-place, all substantially as set forth.

2. A baker's oven having in combination with a baking chamber open at both ends, and with an endless wire-gauze bread-carrier moving through this chamber near its bottom and then back under the oven and fire-place, adjustable stretching rolls outside of such chamber supporting such wire-gauze and serving to stretch it and for bringing it into movement.

3. In an oven having its baking chamber open at both ends, the combination of an endless wire-gauze carrier extending through such open ends and over the fire-place, stretching rolls for such carrier, supports therefor, provided with spiral springs, and regulating screws, whereby the rolls can be removed to or from the oven ends, and the wire-gauze carrier stretched as need be, all substantially as set forth.

In testimony whereof I have signed my name to this specification, in the presence of two subscribing witnesses.

KARL KNUT KARLSTÉEN.

Witnesses:
H. SELANDER,
C. BERMANN.